Aug. 4, 1931.  J. E. ROGERS  1,817,446
SCALE AND CHART THEREFOR
Original Filed April 8, 1925

Patented Aug. 4, 1931

1,817,446

UNITED STATES PATENT OFFICE

JOSEPH E. ROGERS, OF CHICAGO, ILLINOIS, ASSIGNOR TO DAYTON SCALE COMPANY, OF DAYTON, OHIO

SCALE AND CHART THEREFOR

Original application filed April 8, 1925, Serial No. 21,576. Divided and this application filed April 28, 1926. Serial No. 105,329.

This invention relates to weighing scales and more particularly to a chart adapted to be used in conjunction therewith for mixing and compounding purposes.

This application is a division of my copending application Serial Number 21576 filed April 8, 1925, resulting in Patent No. 1,676,052, dated July 3, 1928.

An object of the invention is to facilitate the compounding and mixing of substances.

A feature is a chart adapted for use in co-operation with a weighing scale. This chart is provided with fields preferably successively disposed having weight indicating graduations, designating the amounts or quantities of ingredients, and also preferably having data thereon identifying a substance or ingredient which is represented by the particular weight fields. The chart furthermore may be provided with supplemental mixing instructions or other written information.

For a clear and complete understanding of the objects and advantages of my improved construction of scale and of the charts for use in connection therewith reference may be made to the present practice in a household kitchen where various mixtures of food are concocted. The present practice in a kitchen of the average household is to utilize cook books, receipt books or written receipts, measuring vessels and appliances of various sorts and conversion tables of comparatively rough accuracy. Scales are utilized only to a limited extent, as most receipts specify quantities of substances defined by various liquid measures. As a result the average housewife in preparing a comparatively simple mixture has to utilize not only a large number of books, tables and the like but also various containing vessels and measuring vessels. Furthermore, the housewife must be able to interpolate various tables and convert liquid into dry measure, etc.

By utilizing the scale and the mixing charts which form the subject matter of the present invention this procedure is materially simplified. In place of utilizing cook books, written receipts and the like, the housewife may be provided with a card index file containing a number of supplemental charts or cards. An individual card or chart is provided with a list of the ingredients required and instructions as to their use but also is provided with one or more weight fields, preferably arranged successively and being graduated to define the relative amounts of the various ingredients necessary for a given mixture on a weight basis. For convenience the weight fields of the charts themselves are designated with the particular ingredient represented by the particular weight field. Furthermore, the order or sequence of the fields on the chart determines the order in which ingredients are to be added to the mixture. The housewife after selecting a desired receipt, say, that of a cake, from the card file placed the card, or supplementary receipt chart in a weighing scale constructed in accordance with the present invention. After placing the mixing receptacle upon the scale pan the weight of this receptacle is tared off and the housewife then merely observes the chart and adds the various ingredients in the order called for by the chart. The ingredients are added in the order set forth on the chart and their quantity is readily determined by the housewife observing the correlation of the indicating hand of the scale and the particular fields and designating graduations on the charts which relate to the ingredient being added to the mixing receptacle. In this way the mixing procedure is materially simplified, the use of large numbers of measuring vessels is done away with and comparatively complicated receipts can be made up with great accuracy.

Although the novel features believed to be characteristic of this invention are pointed out with particularity in the claims appended hereto, the invention itself, its objects and advantages, the manner of its organization, and the mode of its operation may be better understood by referring to the following description taken in connection with the accompanying drawings forming a part thereof in which:

Fig. 1 is a transverse sectional view through the chart housing of a weighing scale.

Fig. 2 is a section taken on line 2—2 of Fig. 1.

Fig. 3 is a section taken on line 3—3 of Fig. 1 and

Fig. 4 is an end view of the chart housing showing the card-receiving slots, the view being taken substantially on line 4—4 of Fig. 1 and looking in the direction of the arrow.

Referring to the figures more in detail, the scale to which my invention is to be applied is of the conventional fan type. Indicator 15 of the scale is controlled by the usual counterbalancing mechanism to move over the chart surface in response to the weight of a substance in the weighing receptacle. The chart housing 17 is of the general form used in scales of this type and is arranged to suitably support a fixed weight chart 18. (Figs. 2 and 3.) In order to provide for the reception of supplemental charts which carry directions and graduations to guide the user of the appliance in mixing various receipts the chart housing is provided with an opening at one end and preferably this opening is provided with a tapered guiding member 19 which facilitates the introduction of the cards into the chart housing.

The cards upon which the various receipts and directions are printed is shown in front view in Fig. 1. These cards preferably comprise a central card portion 20 and a rim portion 21, the rim portion being in the form of a beading which stiffens the edges of the cards and prevents the abrasion and mutilation of the same. The rim portion further serves to cooperate with guiding slots 22 (Fig. 3), which are preferably disposed in bracket member 23 fixed to the chart housing. The arrangement of the guide slots 22 is such that the inserted cards 20 with their rim portions 21 pass back of and clear of the indicator 15 so that this indicator can freely traverse the supplementary chart 20 when the same is positioned in the scale.

The supplemental chart 20 which carries the successive weight fields which are delimitated by the graduations 27 is preferably located in the chart housing by a suitable stop or abutment member 30. The location of this abutment member is such that the zero graduation of the supplementary chart is disposed in alignment with the zero point of the fixed weight chart when the supplementary chart or card is pushed in to its fullest extent so as to abut against part 30.

The use of the device may be described by assuming that it is desired to mix a particular sponge cake. The user of the appliance turns to a card file and selects the desired card giving the receipt for the particular cake mixture desired. This receipt card is then inserted in the scale. The indicator 15 now is at zero graduation on the chart 20. The user first adds beaten eggs to the receptacle until the indicator stands at the right hand graduation adjacent the "beaten eggs" designation on the chart. Following this granulated sugar is added until the granulated sugar field on the chart is traversed by the indicator. The operator then observes that the next ingredient symbol is not written out but is merely an initial. By reference to the chart this symbol O is ascertained to call for orange juice. Orange juice is then added until the indicator has traversed this particular field. The succeeding operations are carried out in a like manner until the complete mixture has been added to the receptacle. It is obvious that any desired mixing directions can be printed on the direction chart.

While I have described the present invention particularly with respect to its use in a household it will be understood that the device also finds application in commercial uses where there is a mixing or compounding of any substances or ingredients. For example the device may be utilized for secret compounding inasmuch as the supplemental charts of themselves do not bear any direct weight indications.

Although this invention has been described as applied to a specific apparatus in a particular manner it is not to be limited thereto but only in accordance with the scope of the following claims.

What is claimed is:

1. A mixing direction chart for use in mixing substances upon a weighing scale comprising a plurality of unequal weight fields adapted to be successively scanned by an index line of the scale in a single mixing operation, said fields having delineating weight graduations and commodity or substance designations upon said fields to indicate the commodity or substance represented thereby.

2. A scale reading chart for use in mixing or compounding the ingredients of a substance upon a weighing scale, comprising a series of differently delineated weight fields adapted to be successively scanned by the scale, each for measuring the weight of a different ingredient, and a designation on the chart to denote the substance formed from the ingredients.

In testimony whereof I hereto affix my signature.

JOSEPH E. ROGERS.